No. 633,470. Patented Sept. 19, 1899.
W. H. McCORMICK.
DRIVING GEAR.
(Application filed Apr. 26, 1899.)
(No Model.)
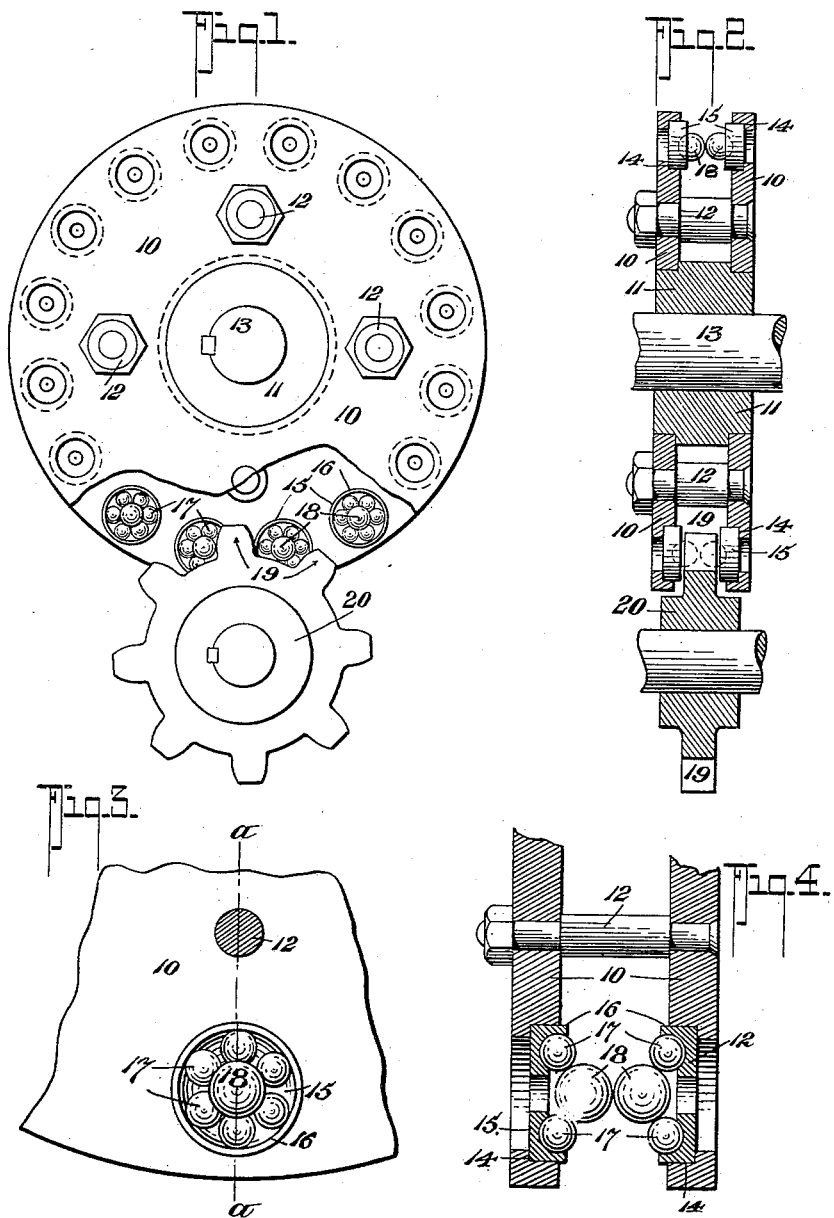
WITNESSES:
INVENTOR
Wm. Henry McCormick
BY
Fred G. Dieterich
ATTORNEY
THE NORRIS PETERS CO., PHOTO-LITHO., WASHINGTON, D. C.

UNITED STATES PATENT OFFICE.

WILLIAM HENRY McCORMICK, OF NEW WESTMINSTER, CANADA.

DRIVING-GEAR.

SPECIFICATION forming part of Letters Patent No. 633,470, dated September 19, 1899.

Application filed April 26, 1899. Serial No. 714,578. (No model.)

*To all whom it may concern:*

Be it known that I, WILLIAM HENRY MC-CORMICK, a citizen of the Dominion of Canada, residing at New Westminster, in the Province of British Columbia, Canada, have invented certain new and useful Improvements in Driving-Gear, of which the following is a specification.

My invention relates to improvements in driving-gear usually applied to bicycles and other gearing of that class or of a light description; and my object is to reduce the friction at the points of contact by the application of a spur-wheel working against balls designed in their arrangement to form the opposite engaging teeth on the other wheel, which is the drive-wheel, the wheel being driven, or the transmitting-wheel. These balls forming the said teeth are arranged in pairs and seated in ball-bearings set in oppositely-disposed disks, the whole being secured to a suitable hub or axle.

I attain the above object by the mechanism illustrated in the accompanying drawings, in which—

Figure 1 is a side view showing two wheels, one of which with a part broken away embodies my invention. Fig. 2 is a section of the same through the center. Fig. 3 is a sectional plan of the inner side of a part of one of the side plates of the wheel, having the balls to engage the spur-wheel; and Fig. 4 is a section of an enlarged detached portion of the wheel having the balls, taken on the line *a a* in Fig. 3.

Similar numerals refer to similar parts through the several views.

The wheel carrying the ball-teeth is preferably composed of disks 10, fitted to a hub 11 and secured together by bolts or rivets 12, arranged at suitable intervals around the said hub, and this hub is secured to an axle 13 in the usual manner.

Arranged at proper intervals around the inner or facing sides of the disks 10, near their outer edges and directly opposite each other, are recesses 14. Securely fixed in these recesses 14 are small disks 15, having annular recesses on their inner or sides facing each other, and their outer rims are extended outward toward each other beyond the inner walls of the disks 10, as 16. Placed in the annular recesses in these disks 15 and providing a moving or rolling seat are balls 17, and seated on these balls 17 and with their outer sides contacting are two larger balls 18.

As shown in Figs. 1, 2, and 4, the balls 18 provide the teeth or gears for the spurs 19 of the wheel 20 to engage with, and owing to the movable support of such balls the friction of the engaging spurs or teeth will be reduced to a minimum, as instead of the teeth slipping on each other as they engage in the operation of advancing and receding the balls 18 will roll along each side of the spur 19, and thus the contact will be smooth and regular.

It is obvious that the construction of the wheel which is formed by the parts 10, 11, and 12 may be modified. For instance, the hub 11 may be integral with one of the disks 10. This, however, would not make any material difference, except, perhaps, in the cost of manufacture.

Having now described my invention, what I claim, and desire to be protected in by Letters Patent, is—

1. In a driving-gear, in combination, a hub 11 mounted on a shaft 13, disks 10 on the hub and connected together at intervals by bolts 12, of disks 15, having annular seats therein for the reception of balls, securely fixed in recesses around the inner sides and near the outer edges of the disks 10, said annular seats or tracks for the balls being directly opposite and facing each other, balls 17 in such seats, and balls 18 lying on the balls 17 and contacting with each other, and a spur-wheel 20 designed to engage the said balls 18 substantially as specified.

2. In a gearing for bicycles and other mechanism of its class, having disks 10 fixed at a proper distance apart so that the spurs on an engaging wheel will pass therebetween, ball sockets or disks 15 fixed around the inner edges of the disks 10, each having an annular track for balls, balls 17 in such annular track, and large balls 18 placed on the balls 17 and contacting with each other, whereby the balls 17 will be held in their positions, and rotatable engaging members will be provided for the engagement of spurs on a wheel to be driven.

WILLIAM HENRY McCORMICK.

Witnesses:
ROWLAND BRITTAIN,
EDITH G. MACKENROT.